United States Patent [19]
Hsu et al.

[11] Patent Number: 5,789,524
[45] Date of Patent: Aug. 4, 1998

[54] CHEMICAL IMIDIZATION REAGENT FOR POLYIMIDE SYNTHESIS

[75] Inventors: Steve L. C. Hsu, East Providence; Ahmad Naiini, Warwick; William D. Weber, Cranston, all of R.I.; Andrew J. Blakeney, Seekonk, Mass.

[73] Assignee: Olin Microelectronic Chemicals, Inc., Norwalk, Conn.

[21] Appl. No.: 839,585

[22] Filed: Apr. 15, 1997

[51] Int. Cl.$^6$ .......................... C08G 73/10; C08G 69/28; C08G 69/26

[52] U.S. Cl. .......................... 528/170; 528/173; 528/188; 528/229; 528/310; 528/312; 528/313; 528/322; 528/324; 528/331; 528/332; 528/337; 528/345; 528/347; 528/353; 524/600; 524/606

[58] Field of Search .......................... 528/312, 313, 528/310, 345, 322, 324, 332, 331, 170, 173, 188, 229, 337, 347, 353; 524/600, 606

[56] References Cited

U.S. PATENT DOCUMENTS

| | | | |
|---|---|---|---|
| 3,179,630 | 4/1965 | Endrey | 524/600 |
| 3,179,632 | 4/1965 | Hendrix | 524/600 |
| 3,271,366 | 9/1966 | Kreuz | 524/600 |
| 3,282,898 | 11/1966 | Angelo | 524/600 |
| 3,541,057 | 11/1970 | Kruez | 524/600 |
| 5,302,489 | 4/1994 | Shu | 430/191 |
| 5,399,655 | 3/1995 | Simmons, III | 528/176 |
| 5,587,275 | 12/1996 | Kato | 430/283.1 |

FOREIGN PATENT DOCUMENTS 0 421 195 A2  4/1991  European Pat. Off.

OTHER PUBLICATIONS

Mitsuru Ueda et al., *Macromolecules 1988*, 21, 19–24 The month in the pub. date is not available.

E. Chin et al., *Advances in Polyimide Science and Technology—Proceedings of the Fourth International Conference on Polyimdes*, Edited by C. Feger et al., 1993, pp. 201–202, Technomic Publishing Co., Ltd., Lancaster, PA The month in the pub. date is not available.

Hayase et al., *Journal of Applied Polymer Science*, vol. 51, pp. 1971–1978 (1994) The month in the pub. date is not available.

M. Ueda et al., *Markromol. Chem.*, 194, pp. 511–521 (1993) The month in the pub. date is not available.

*Primary Examiner*—P. Hampton-Hightower
*Attorney, Agent, or Firm*—Ohlandt, Greeley, Ruggiero & Perle

[57] ABSTRACT

A process for producing a polyimide composition by reacting at least one polyamic acid or at least one polyamic ester or a mixture of at least one polyamic acid and at least one polyamic ester with a selected phosphoramide in the presence of at least one base catalyst to from a polyimide composition.

7 Claims, No Drawings

CHEMICAL IMIDIZATION REAGENT FOR POLYIMIDE SYNTHESIS

BACKGROUND OF THE INVENTION

1. Field of the Invention

This invention covers a process for preparing polyimide compositions comprising reacting a specific chemical imidization reagent with at least one polyamic acid or at least one polyamic ester or a combination thereof in the presence of a base catalyst. These polyimide compositions are useful as organic dielectric insulating films for use in electronic semiconductor devices and multilayer electronic structures; as protective coatings or in electronic semiconductor devices and packages; as oriented films for use in the fabrication of liquid crystal display elements; as matrix resins in structural composites; and as membranes for use in separation processes.

2. Brief Description of the Art

Aromatic polyimides are usually synthesized by a two-step method. In the first step, a soluble precursor, polyamic acid, is formed by the reaction of at least one of the diamine with at least one dianhydride. In the second step, dehydrative cyclization of the polyamic acid creates the polyimide. This imidization reaction can be carried out by heating at elevated temperature or by treatment with chemical imidization agents at ambient temperature. The most commonly used dehydrating agents are acid anhydrides used in combination with a base catalyst. The acid anhydrides that have been used include acetic anhydride, propionic anhydride, n-butyric anhydride, benzoic anhydride and the like. The base catalysts used in the past include pyridine, trialkylamines, methylpyridine, lutidine, n-methylmorpholine, and the like. Alternatively, polyamic acid esters have been used in the past instead of polyamic acids as precursors for polyimides. However, because of their higher cost, polyamic acid esters have not been favored.

Separately, the synthesis of diphenyl (2,3-dihydro-2-thioxo-3-benzoxazoyl) phosphonate (DDTBP) (see formula (I)) and its use as an activating agent for amide condensations was first reported by Mitsuru Ueda et al. in 1988 (*Macramolecules* 1988, 21, 19–24).

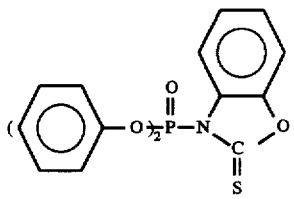

(1)

Recently, E. Chin et al. (see *Advances in Polyimide Science and Technology—Proceedings of the Fourth International Conference on Polyimides*. Edited by C. Feger et al. 1993, pages 201–212, Technanic Publishing Co., Ltd. Lancaster, Pa.) teach the use of DDTBP as a coupling reagent to prepare polyamic acid esters by the direct polycondensation from tetracarboxylic diacid diester monomers.

Also, Hayese et al. (see *Journal of Applied Polymer Science*, Vol. 51, pages 1971–1978 (1994)) teach the reaction of a tetracarboxylic diacid diester with a diamine using DDTBP as a coupling agent to make a polyamic acid diester.

And, M. Ueda et al. (see *Macromol. Chem.*, 194, 511–521 (1993)) teach the direct polycondensation of di-tert.-butyl esters of tetracarboxylic acids with diamines to make polyamic acid tert.-butyl esters, using DDTBP as the activating agent.

None of these references reported that DDTBP may be used as a chemical imidization agent for making polyimides. In the present invention, it has been found that the use of DDTBP in combination with a base catalyst will chemically imidize polyamic acids or polyamic esters to polyimides.

SUMMARY OF THE PRESENT INVENTION

Accordingly, the present invention is directed to a process for preparing polyimide compositions by reacting at least one polyamic acid or at least one polyamic ester or a mixture of at least one polyamic acid and at least one polyamic ester with a phosphoramide in the presence of at least one base catalyst to form a polyamide composition; said phosphoramide is a compound of formula (2):

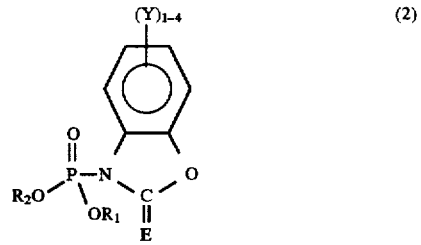

(2)

wherein

E is either oxygen or sulfur;

$R_1$ and $R_2$ are individually selected from the group consisting of alkyl group having 1–4 carbon atoms; aryl group; substituted aryl group having 1–3 substituents, said substituents are individually selected from halogen groups, alkyl groups having 1–4 carbon atoms, nitro groups, and alkoxy groups having 1–4 carbon atoms; and each Y is individually selected from the group consisting of hydrogen, a halogen group, nitro group, alkyl group having 1–4 carbon atoms, alkoxy group having 1–4 carbon atoms; and aryl group; and wherein said polyamic acid ester does not include esters of pyromellitic dianhydride.

DETAILED DESCRIPTION OF THE PREFERRED EMBODIMENTS

This invention relates to the synthesis of polyimides from polyamic acids or polyamic esters or mixtures thereof in the presence of a selected phosphoramide and a base catalyst.

1) Preferred Phosphoramides

The preferred phosphoramide is diphenyl (2,3-dihydro-2-thioxo-3-benzoxazoyl) phosphonate (DDTBP) or where E is sulfur; $R_1$ and $R_2$ are both phenyl groups and all Y groups are hydrogens.

The preferred method for making DDTBP is that described by Ueda et al. (*Macromolecules* 1988, 21 19–24) except that toluene is used instead of benzene.

2) Preferred Polyamic Acids

The preferred polyamic acids have the general formula (3):

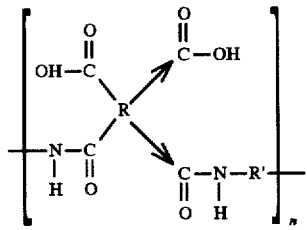

wherein R is a tetravalent radical; R' is a divalent radical; and → denotes isomerization.

The preferred polyamic acids may be prepared by reacting at least one diamine with at least one tetracarboxylic acid dianhydride in an organic solvent.

The preferred tetracarboxylic dianhydride could be but is not restricted as following: pyromellitic dianhydride, 3,3', 4,4'-benzophenonetetracarboxylic dianhydride, 3,3', 4,4'-biphenyltetracarboxylic dianhydride, 3,3', 4,4'-diphenylsulfonetetra-carboxylic dianhydride, 4,4'-perfluoroisopropyl-idenediphthalic dianhydride, 4,4'-oxydiphthalic anhydride, 3,6-diphenylpyromellitic dianhydride, bis (3,4-dicarboxyl) tetramethyldisiloxane dianhydride, bis(3,4-dicarboxylphenyl)dimethylsilane dianhydride, butane tetracarboxylic dianhydride, and 1,4,5,8-naphthalenetetracarboxylic dianhydride. These tetracarboxylic dianhydrides can be used singly or in combination.

The preferred diamine could be but is not restricted as following: m-phenylenediamine, p-phenylenediamine, 2,2'-bis(trifluoromethyl)-4,4'-diamino-1,1'-biphenyl, 3,4'-diaminodiphenyl ether, 4,4'-diaminodiphenyl ether, 3,3'-diaminodiphenyl ether, 2,4-tolylenediamine, 3,3'-diaminodiphenyl sulfone, 3,4'-diaminodiphenyl sulfone, 4,4'-diaminodiphenyl sulfone, 3,3'-diaminodiphenylmethane, 4,4'-diaminodiphenylmethane, 3,3'-diaminodiphenylmethane, 3,4'-diaminodiphenylmethane, 4,4'-diaminodiphenyl ketone, 3,3'-diaminodiphenyl ketone, 3,4'-diaminodiphenyl ketone, 1,3-bis(4-aminophenoxy) benzene, 1,3-bis(3-amino-phenoxy)benzene, 1,4-bis(γ-aminopropyl)tetra-methyldisiloxane, and 4,4'-diaminodiphenyl sulfide and 1,3,3-trimethylphenylindane diamine. These diamines can be used singly or in combination.

The preferred solvents include N-methyl-2-pyrrolidinone (NMP), N,N-dimethylacetamide (DMAC) dimethylsulfoxide (DMSO), N,N-dimethylformamide (DMF), sulfolane, and diglyme.

Any conventional reaction conditions for reacting such dianhydrides with diamines may be used. Generally, the reaction is carried out at about 10° C. to about 50° C. for about 6 to 48 hours. The molar ratio of dianhydride to diamine should be about 0.9–1.1:1.

The most preferred polyamic acids are shown in Examples 1–3 below.

3) Preferred Polyamic Acid Esters

The preferred polyamic acid esters have the general formula (4):

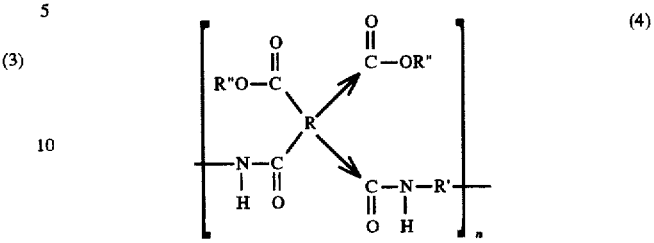

wherein R is a tetravalent radical; R' is a divalent radical; R" is a monovalent radical; and → denotes isomerization. The polyamic acid ester cannot be an ester that is derived from pyromellitic dianhydride because little imidization will occur.

The ester groups R" in the polyamic acid ester may be but are not restricted as following: methyl, ethyl, isopropyl, n-butyl, t-butyl, 2-hydroxybenzyl, 3-hydroxybenzyl, and 4-hydroxybenzyl.

The preferred polyamic acid esters may be prepared by reacting at least one diamine with at least one tetracarboxylic diester dihalide or by reacting at least one diamine with at least one tetracarboxylic diacid diester in the presence of an in situ coupling agent such as dicyclohexyl-carbodiimide (DCC), N,N'-carbonyldiimidazole, benzotriazol-1-yl diethyl phosphate, TiCl$_4$, or bis[bis(trimethylsilyl)amino] tin, in an organic solvent.

The preferred solvents are the same as those employed in making polyamic acids mentioned above.

The preferred reaction conditions are at about –10° C. to about 50° C. for about 6 to about 48 hours. The preferred molar ratio of diamine to tetracarboxylic diester dihalide is about 0.9–1.1:1, most preferably 1:1.

The most preferred polyamic acid ester is made by Example 4 below.

4) Preferred Base Catalysts

Any base catalyst that is suitable for making polyimide compositions may be used. The preferred class of base catalysts are tertiary amines. The most preferred base catalyst is triethylamine.

5) Preferred Reaction Conditions for Reacting Phosphoramides with Polyamic Acids or Polyamic Acid Esters The mole ratio of ingredients is preferably in the range of about 1:2–4:2–4 of (polyamic acid or polyamic acid ester or mixtures thereof):phosphoramide:base catalyst. More preferably, this molar ratio is from 1:2.5–3.5:2.5–3.5. Most preferably, this molar ratio is from 1:3.0–3.5:3.0–3.5.

The reaction temperature is preferably from about 10° C. to about 50° C.; more preferably, from 20° C. to 30° C. The preferred reaction time is from about 12 to about 48 hours.

The ingredients are preferably added together by adding the polyamic acid or polyamic acid ester to the reaction vessel first. Alternatively, the polyamic acid or polyamic acid ester may be prepared in situ first. Then, the base catalyst is added, followed by the phosphoramide. The reaction is generally carried out in the presence of a solvent to prevent the formation of a gel. Early gelation could inhibit the imidization reaction. The most preferred solvent is N-methyl-2-pyrrolidinone (NMP). Alternatively, other solvents such as DMAC, DMSO, DMF, sulfolane and diglyme may be used. During the reaction, water (in the case of polyamic acid) or the corresponding alcohol (in the case of the polyamic acid ester) is formed as a by-product.

After the reaction time is over, the reaction mixture is preferably mixed with methanol to precipitate the polyimide product from any remaining phosphoramide and base catalyst. The polyimide precipitate is then washed with more methanol and then dried in a vacuum oven at about 20°–50° to remove water and any residual alcohol or solvent.

The reaction mixture is preferably analyzed with FTIR and proton NMR spectrography to confirm polyimide formation. A strong absorption band characteristic of polyimide appears at 1778 cm$^{-1}$ in the FTIR spectrum.

6) Preferred Polyimide Compositions

The resulting polyimides have the following formula (5):

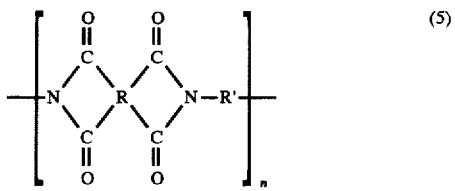

wherein R is a tetravalent radical having an aromatic ring or an aliphatic ring; and R' is a divalent radical.

To illustrate the present invention, the following examples are provided. These examples, which represent specific embodiments of the present invention, should not be considered limitative of the invention. The abbreviations as used herein are defined as follows:

| Abbreviation | Full Name |
|---|---|
| 6FDA | 4,4'-perfluoroisopropylidine diphthalic anhydride |
| ODA | 4,4'-diaminodiphenyl ether |
| NMP | N-methyl-2-pyrrolidinone |
| ODPA | 4,4'-oxydiphthalic anhydride |
| PMDA | Pyromellitic dianhydride |
| DAPI | 1,2,3-trimethylphenylindane diamine |

Example 1

To a dry 250 mL three-necked flask equipped with a nitrogen inlet and mechanical stirrer, 4 g (9.0 mmol) of 6FDA, 1.80g (9.0 mmol) of ODA and 50 mL of NMP were added. After the solution was stirred for 18 hours under nitrogen at ambient temperature, 2.73 g (27.0 mmol) of triethylamine was added first and then 11.38 g (29.7 mmol) of DDTBP was slowly added later. After the solution was stirred at ambient temperature for 24 hours, it was diluted with 50 mL of NMP and then precipitated in 1200 mL methanol. The polymer was collected by filtration; washed with methanol and then dried in a vacuum oven at 50° C. for 24 hours. 5.2 g (95% yield) of polymer was obtained. The FTIR spectrum showed a strong imide absorption at 1778 cm$^{-1}$ which indicated that a highly imidized polyimide was formed. The polymer was partially soluble in NMP.

Example 2

To a dry 250 mL three-necked flask equipped with a nitrogen inlet and mechanical stirrer, 1.09 g (5.0 mmol) of PMDA, 1 g (5.0 mmol) of ODA and 25 mL of NMP were added. After the solution was stirred for 18 hours under nitrogen at ambient temperature, 42 ml of NMP, and 1.50 g (14.8 mmol) of triethylamine were added and then 6.32 g (16.5 mmol) of DDTBP was added slowly. The solution became cloudy and gel-like 10 min after the addition of DDTBP. After the solution was stirred at ambient temperature for 24 hours, it was precipitated in 1200 mL methanol. The polymer was collected by filtration, washed with methanol and then dried in a vacuum oven at 50° C. for 24 hours. The FTIR spectrum showed a strong imide absorption at 1778 cm$^{-1}$ which indicated that a highly imidized polyimide was formed. The polymer was not soluble in NMP.

Example 3

To a dry 250 mL three-necked flask equipped with a nitrogen inlet and mechanical stirrer, 2 g (6.4 mmol) of ODPA, 1.715 g (6.4 mmol) of DAPI, and 33 mL of NMP were added. After the solution was stirred for 18 hours under nitrogen at ambient temperature, 10 mL of NMP and 2 g (19.8 mmol) of triethylamine were added and then 8.15 g (21.3 mmol) of DDTBP was slowly added. After the solution was stirred at ambient temperature for 24 hours, it was diluted with 50 ml of NMP and then precipitated in 1200 mL methanol. The polymer was collected by filtration, washed with methanol and then dried in a vacuum oven at 50° C. for 24 hours. The FTIR spectrum showed a strong imide absorption at 1778 cm$^{-1}$ which indicated that a highly imidized polyimide was formed. This polyimide was soluble in NMP and had an inherent viscosity of 1.13 (dL/g) measured in NMP at the concentration of 0.5 g/dL at 25° C.

Example 4

First step: To a 250 mL three-necked flask equipped with a nitrogen inlet, mechanical stirrer, and temperature controller, 6.0 g (20 mmol) of ODPA, 1.84 g (40 mmol) of ethanol and 30 mL of NMP were added. The mixture was heated to 75° C. and stirred at this temperature for 4 hours. The solution was cooled to ambient temperature and 6.65 g of pyridine and 20 mL of NMP were added. The reaction mixture was cooled to 0°–4° C. by using an ice-bath and 5.4 g of SOCl$_2$ was added slowly by using an addition funnel over 30 minutes. After diluted with 30 mL of NMP, the solution was stirred at ambient temperature for 3 hours. 4 g (20 mmol) of ODA was dissolved in 30 mL of NMP and then added slowly to the reaction mixture via an addition funnel over 30 min. The reaction mixture was stirred for 18 hours at ambient temperature and then precipitated in 1000 mL of deionized water. The polymer was collected by filtration and dried at 50° C. under vacuum for 24 hours. There was no imide absorption in the FTIR spectrum of this polyamic ester.

Second step: 1.5 g of this polyamic ester was dissolved in 40 mL of NMP at ambient temperature under nitrogen. To this solution was added 0.75 mL of triethylamine followed by slow addition of 3.35 g of DDTBP over a period of 10 minutes. The reaction mixture was stirred at 50° C. for 18 hours and then precipitated in 1000 mL of methanol. The polymer was collected by filtration, washed with methanol, and then dried at 50° C. under vacuum for 24 hours. The FTIR spectrum showed a strong imide absorption at 1778 cm$^{-1}$ which indicated a highly imidized polyimide was formed.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for producing polyimide composition by reacting at least one polyamic acid or at least one polyamic ester or a mixture of at least one polyamic acid and at least one polyamic ester with a phosphoramide in the presence of at least one base catalyst to form a polyimide composition; wherein said phosphoramide is a compound of formula (2):

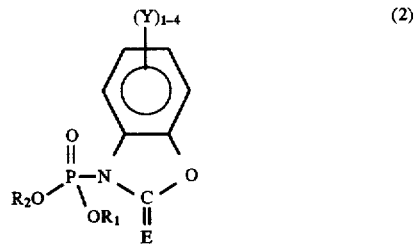

(2)

wherein E is oxygen or sulfur; $R_1$, and $R_2$ are individually selected from the group consisting of alkyl groups having 1–4 carbon atoms, aryl groups, substituted aryl groups having 1–3 substituents, said substituents are individually selected from halogen group, alkyl group having 1–4 carbon atoms, nitro group and alkoxy group having 1–4 carbon atoms; and each Y is individually selected from hydrogen, halogen, nitro, alkyl group having 1–4 carbon atom and alkoxy group having 1–4 carbon atoms; and wherein said polyamic acid ester does not include esters of pyromellitic dianhydride.

2. The process of claim 1 wherein said phosphoramide is diphenyl (2,3-dihydro-2-thixo-3-benzoxazoyl) phosphonate.

3. The process of claim 1 wherein a polyamic acid is reacted and that polyamic acid is made from an anhydride selected from the group consisting of 4,4'-perfluoro-isopropylidine diphthalic anhydride, 4,4'-oxydiphthalic anhydride and pyromellitic anhydride.

4. The process of claim 1 wherein said diamine is selected from 4,4'-diaminophenyl ether and 1,3,3-trimethylphenylindane diamine.

5. The process of claim 1 wherein the molar ratio of (polyamic acid or polyamic acid ester or mixtures thereof): phosphoramide: base catalyst is about 1:2–4:2–4.

6. The process of claim 1 wherein said base catalyst is a tertiary amine.

7. The process of claim 6 wherein said tertiary amine is triethylamine.

* * * * *

UNITED STATES PATENT AND TRADEMARK OFFICE
CERTIFICATE OF CORRECTION

PATENT NO. : 5,789,524

DATED : August 4, 1998

INVENTOR(S) : Steve L.C. Hsu, Ahmad Naiini, William D. Weber and Andrew J. Blakeney It is certified that error appears in the above-identified patent and that said Letters Patent is hereby corrected as shown below:

Column 1, line 59, "Hayese" should read --Hayase--

Column 2, line 17, "polyamide" should read --polyimide--

IN THE ABSTRACT:

Line 5, "from" should read --form--

Signed and Sealed this

Eighth Day of February, 2000

Attest:

Q. TODD DICKINSON

Attesting Officer

Commissioner of Patents and Trademarks